(12) United States Patent
Freimann

(10) Patent No.: US 6,604,243 B1
(45) Date of Patent: Aug. 5, 2003

(54) SYSTEM AND METHOD FOR INFORMATION FILTERING

(75) Inventor: Felix Freimann, Suunyvale, CA (US)

(73) Assignee: Open TV, Mountain View, CA (US)

( * ) Notice: Subject to any disclaimer, the term of this patent is extended or adjusted under 35 U.S.C. 154(b) by 0 days.

(21) Appl. No.: 09/189,733

(22) Filed: Nov. 10, 1998

(51) Int. Cl.[7] .............................................. H04N 5/445
(52) U.S. Cl. ........................ 725/131; 725/53; 725/139; 725/151
(58) Field of Search ............................ 725/45, 46, 120, 725/53, 131, 139, 151

(56) References Cited

U.S. PATENT DOCUMENTS

| | | | | |
|---|---|---|---|---|
| 5,410,344 A | * | 4/1995 | Graves et al. ................. | 725/46 |
| 5,600,378 A | | 2/1997 | Wasilewski ................. | 348/468 |
| 5,760,821 A | * | 6/1998 | Ellis et al. ...................... | 725/50 |
| 5,864,358 A | | 1/1999 | Suzuki et al. ................. | 348/10 |
| 5,909,257 A | | 6/1999 | Ohishi et al. ................ | 348/726 |
| 5,943,605 A | | 8/1999 | Koepele, Jr. ................. | 455/6.2 |
| 5,999,216 A | | 12/1999 | Kaars .......................... | 348/385 |
| 6,002,394 A | * | 12/1999 | Schein et al. .................. | 725/39 |
| 6,005,631 A | * | 12/1999 | Anderson et al. ............. | 725/53 |
| 6,025,837 A | * | 2/2000 | Matthews, III et al. ...... | 345/721 |
| 6,134,554 A | * | 10/2000 | Freimann et al. ........... | 707/100 |
| 6,216,264 B1 | * | 4/2001 | Maze et al. ................... | 725/53 |

* cited by examiner

*Primary Examiner*—Andrew Faile
*Assistant Examiner*—Andrew Y Koenig
(74) *Attorney, Agent, or Firm*—Madan, Mossman & Sriram, P.C.

(57) ABSTRACT

According to an embodiment of the present invention, a fast matching algorithm uses a memory space efficient data structure to accomplish information filtering in a system receiving information, such as a set top box used in conjunction with a television set. The data structure, according to an embodiment of the present invention, may include a node with a plurality of levels of expected values of data fields with an associated index to another node to be used when a matching identification of a particular level is not found. Additionally, according to an embodiment of the present invention, the nodes in this data structure may include a level field which identifies levels which are valid within the node.

8 Claims, 11 Drawing Sheets

| BYTE | BIT | SECTION # |
|---|---|---|
| 1 | 1 | 0 |
|  | • | • |
|  | • | • |
|  | • | • |
|  | 8 | 7 |
| 2 | 1 | 8 |
|  | • | • |
|  | • | • |
|  | • | • |
|  | 8 | 15 |
| • | • | • |
| • | • | • |
| • | • | • |
| 32 | 1 | • |
|  | • | • |
|  | • | • |
|  | • | • |
|  | 8 | 255 |

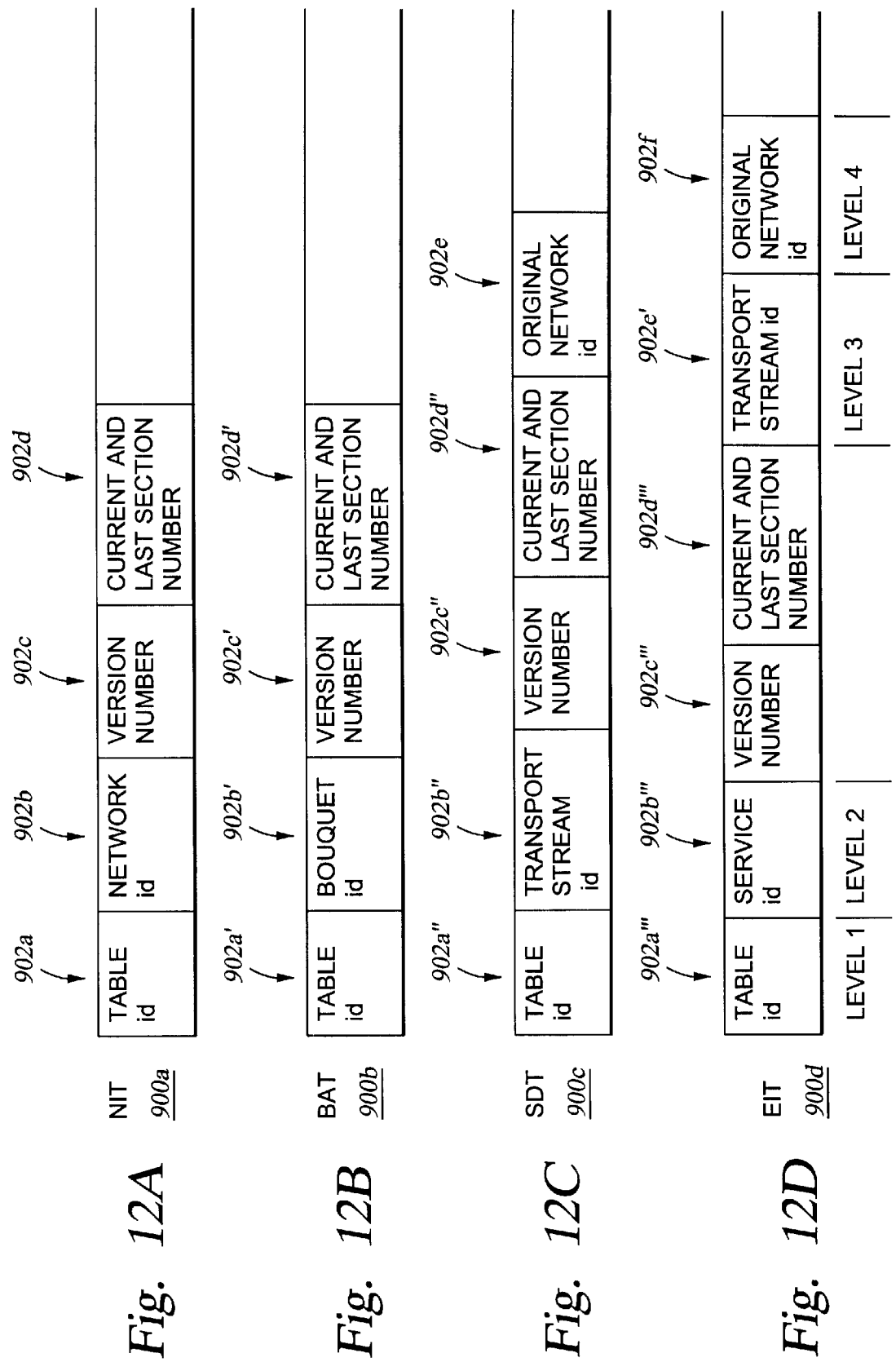

SYSTEM AND METHOD FOR INFORMATION FILTERING

FIELD OF THE INVENTION

The present invention relates to electronic receipt of information. In particular, the present invention relates to software filtering of information received by a set top box.

BACKGROUND OF THE INVENTION

In a data receiving system, such as an interactive television system, information, such as service information (SI), may be sent from a head end in various blocks of data, sometimes referred to as sections, via various transport mediums. For example, data sections may be sent from a head end via cable or satellite to a set top box coupled to a television set. An example of the contents of such data sections include information regarding present or following events, services which the user of the set top box may access, and the current time and date. Examples of events may include a television program, or a commercial, while an example of services may be a set of channels subscribed to by a viewer.

A particular set top box need only acquire sections which are required by that particular set top box, sections which are new, or sections which have changed. For example, if a viewer has only subscribed to a set of basic channels, then the sections specific to a special sports channel or movie channel not included in the basic channel set would not be required by the set top box. Accordingly, all sections which do not meet a particular set top boxes criteria's may be disregarded. The acceptance of a few select sections and rejection of all other sections may be accomplished though a combination of hardware and software filtering mechanisms.

A hardware filtering mechanism will typically perform a first round of filtering and pass on those sections which are accepted to a software filtering mechanism. The software filtering mechanism typically analyzes a header of the section, which is commonly the first 8 to 12 bytes of a section. When the start of a new section is detected, the section header is typically acquired form the transport stream. This section header is then passed to the software filter process which typically decides whether the remainder of the section should be acquired or rejected. If it is determined that the section is required, then the remainder of the section is acquired and passed on for further processing. Accordingly, only sections which have passed the software filter process will typically be forwarded for further processing.

A section may be uniquely identified by a number of individual fields within the section header. For example, depending of the section type, up to four individual fields may be used to identify a section. When a specific section is required, the software filter process may store the expected values of the individual data fields of the section header. When a section header is passed to the software filter, these expected values may be compared with the actual values from the section header. If no match occurs the next set of expected values may be compared until either a match occurs or no more expected values are available for comparison. Because the software filter may search a substantially large number of expected section header values, it is desirable to have a highly efficient comparison algorithm. A highly efficient comparison algorithm is particularly desirable since a problem may occur if a new section arrives before the software filter has finished evaluating a current section. This situation may cause an overflow or the new section may be lost. Additionally, a set top box may search for a variety of different sections at any one time, thus increasing the need for efficiency.

In addition to the need for efficiency, another common factor that is the need for memory. The memory usage for storage of the large number of expected values is typically a substantially large percentage of the very limited amount of memory commonly available in set top boxes.

It would be desirable to have a time efficient matching algorithm which uses a memory space efficient data structure. The present invention addresses such needs.

SUMMARY OF THE INVENTION

According to an embodiment of the present invention, a fast matching algorithm uses a memory space efficient data structure to accomplish information filtering in a system receiving information, such as a set top box used in conjunction with a television set. The data structure, according to an embodiment of the present invention, may include a node with a plurality of levels of expected values of data fields with an associated index to another node to be used when a matching identification of a particular level is not found. Additionally, according to an embodiment of the present invention, the nodes in this data structure may include a level field which identifies levels which are valid within the node.

In addition, according to an embodiment of the present invention, a section map may be used which utilizes a series of section maps, each section map including a predetermined number of bits, such as 32 bits. Each section map may include a single bit which indicates what is stored in the first 15 bits. For example, the last 16 bits of a section map may indicate whether the first 16 sections have been received. Another bit may be used to indicate what is stored in the first 15 bits. For example, the first 15 bits may indicate whether the next 15 sections have been received, or they may indicate an index pointing to the next section map.

A method according to an embodiment of the present invention for filtering information in an interactive television environment is presented. The method comprises providing a data structure, wherein the data structure includes a plurality of levels; and comparing information with a first criteria, wherein the first criteria is related to a first one of the plurality of levels. The method also compares the information with a second criteria, wherein the second criteria is related to a second one of the plurality of levels, this comparison occurring if the information matches the first criteria.

A system according to an embodiment of the present invention for filtering information in an interactive television environment is also presented. The system comprises a memory configured to provide a data structure, wherein the data structure includes a plurality of levels. The system also includes a processor coupled to the memory, the processor being configured to compare the information with a first criteria, wherein the first criteria is related to a first one of the plurality of levels. The processor is also configured to compare the information with a second criteria, wherein the second criteria is related to a second one of the plurality of levels, this comparison occurring if the information matches the first criteria.

A method according to an embodiment of the present invention for recording receipt of information is also presented. The method comprises providing a section number, and providing a first section map, wherein the first section map is associated with a number of bits. The method also determines whether the section number is less than the number of bits; and points to a second section map if the section number is not less than the number of bits.

A system according to an embodiment of the present invention for recording receipt of information is also presented. The system comprises a memory configured to provide a first section map, the first section map being associated with a number of bits, and a processor coupled to the memory. The processor is configured to provide a section number; determine whether the section number is less than the number of bits; and point to a second section map if the section number is not less than the number of bits.

BRIEF DESCRIPTION OF THE DRAWINGS

FIGS. 12A–12D are illustrations of examples of a section header suitable for use with an embodiment of the present invention.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
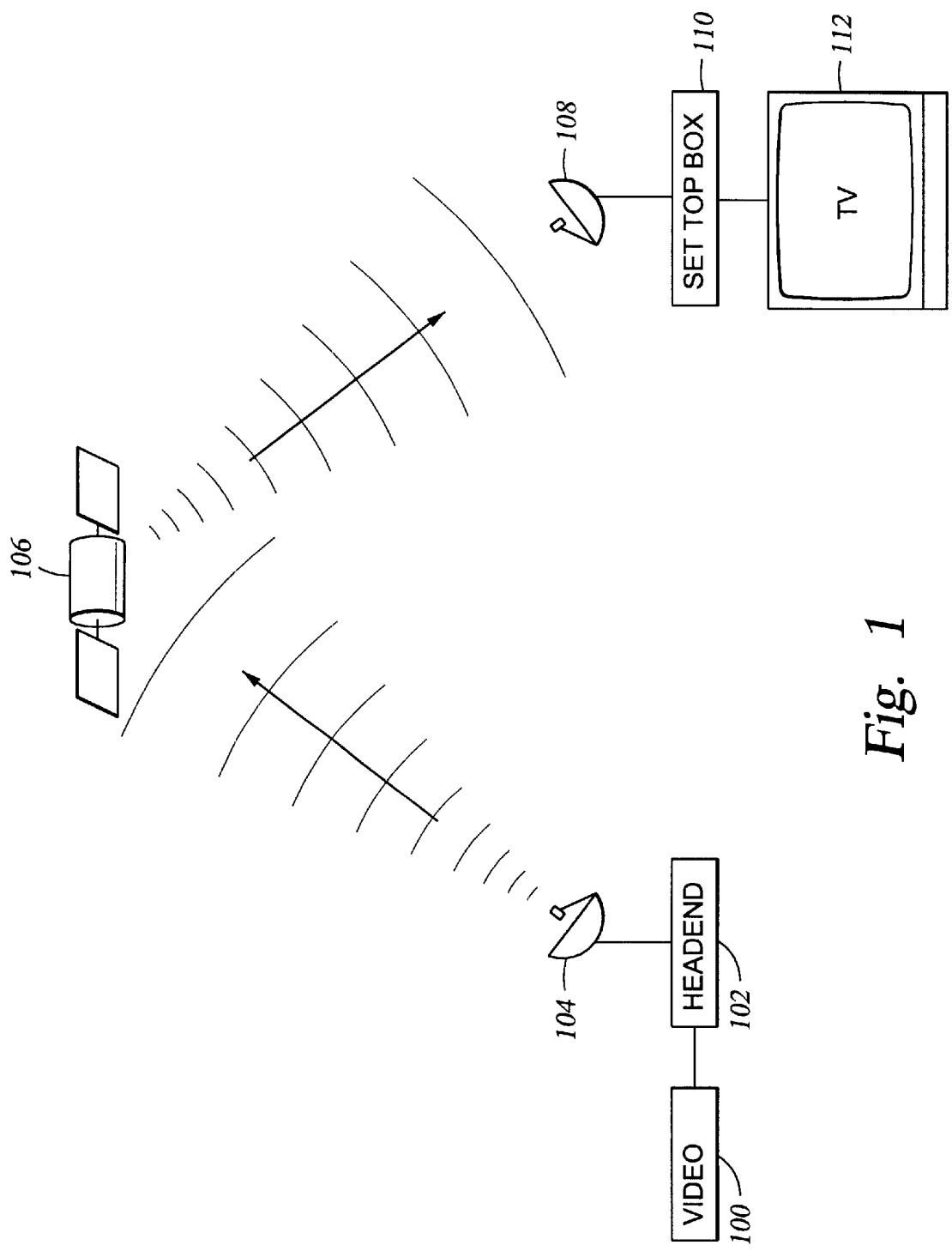
FIG. 1 is a block diagram of a system suitable for implementing an embodiment of the present invention.

FIG. 1 is a block diagram of an information receiving system suitable for implementing an embodiment of the present invention. The system of FIG. 1 is shown to include a head end 102 which may be coupled with a video and audio device 100 which feeds a particular video with associated audio to the head end 102. The video information may be digitized at the head end 102 and transmitted via a transmitter 104 to a receiving system. The information transmitted by the head end 102 may be transmitted to the receiving system in various ways. For example, the transmitted information may be sent to the receiving system via a satellite 106. Alternatively, a cable may be used to transmit information from the head end 102 to a receiving system. An example of a receiving system includes a television 112 coupled with a set top box 110. The set top box 110 may be coupled with a receiving antenna 108 for receiving information from the satellite 106.

Once information is received through the receiving antenna 108, it may be processed by the set top box 110 and displayed on the television set 112. In this manner, audio, video, and interactive data may be received and processed by the set top box 110.

Figure 2:
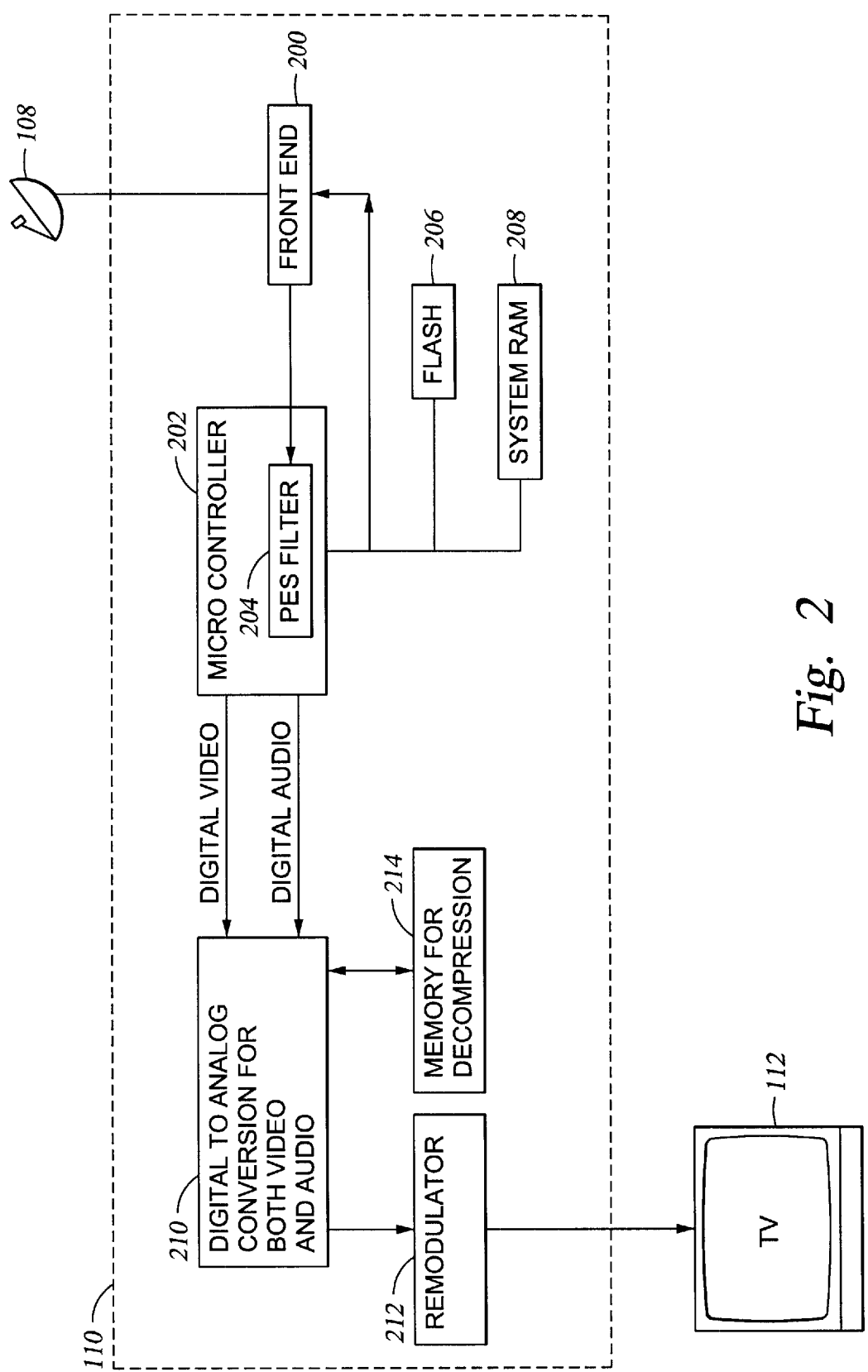
FIG. 2 is a block diagram of an example of a set top box suitable for implementing an embodiment of the present invention.

FIG. 2 is a block diagram of a set top box, such as set top box 110 of FIG. 1, suitable for implementing an embodiment of the present invention. The set top box 110 shown in FIG. 2 is shown to be coupled with the receiving antenna 108 and the television 112. A signal received by the receiving antenna 108 is sent to a front end 200 which converts the modulated signals received from the receiving antenna 108 to a demodulated digital signal. The signals are then sent form the front end 200 to a micro-controller 202. The micro-controller may include a hardware filter, such as a private elementary stream (PES) and service information (SI) filter's 204. Although a single PES filter 204 is shown in FIG. 2, a set of a plurality of PES filters may actually be used. The PES filter 204 may select packets out of the packet stream of the received signal. Once packets are selected by the PES filter 204, they may be sent to be processed by a software filter in the micro-controller 202. The software filter then further selects packets from the set of packets received from the PES filter 204. Digital video signals and digital audio signals are then sent to a digital-to-analog converter 210. There may be a digital-to-analog conversion for video as well as for audio.

The micro-controller 202 is also shown to be coupled with a FLASH memory 206 and a system random access memory (RAM) 208. Programs which are run by the micro-controller 202 may be located in the FLASH memory 206, while other information, such as a database, may be located in the system RAM 208.

The digital-to-analog converter 210 is also shown to be coupled with a memory for decompression 214 which may be utilized in decompressing compressed signals. The digital-to-analog converter 210 is also shown to be coupled with a remodulator 212 which can remodulate audio and video signals for proper format to be displayed on the television 112.

Data received by the set top box 110 may be intended to be formatted into various tables. When a series of packets are received, they may be formatted into tables such as a network information table (NIT), bouquet association table (BAT), service descriptor table (SDT), and event information table (EIT). These tables are described in the Digital Video Broadcasting (DVB) standard. For further information regarding the DVB standard, the following internet site may be referenced: http://www.atsc.org.

As the data stream is received, the PES filter, such as the PES filter 204 of FIG. 2, performs an initial filter function of the packet stream. Thereafter, the packets which have been selected by the PES filter are then processed through a software filter. A micro-controller may include multiple PES filters, such as 16 to 32 hardware PES filters to process through packets which are coming into the system at a very fast rate. The incoming packet stream may be transmitted at 18 to 50 mega bits per second.

A receiving system may receive all types of tables, including NIT, BAT, SDT, and EIT. A television network may have a large number of services. The NIT identifies where these service may be found; the BAT may group these services into categories, such as movies or sports; the SDT indicates more detailed information on these services; and the EIT commonly indicates additional information regarding services, such as the title and language.

During the software filter process, the various types of tables may have different levels of filtering criteria. For example, an NIT table may have a level one filtering criteria of identifying a table ID, and a level two filtering criteria of a network ID. The table ID identified the table that a section will be a part of when it is formatted, such as NIT, BAT, etc. The network ID identified the network. In this example, a BAT table may have a level one criteria of a table ID and a level two criteria of a bouquet ID. A bouquet may be a predetermined combination of services, such as a combination of sports programs and movie programs, that a subscriber may subscribe to. A bouquet ID identifies a particular type of bouquet. Also in this example, the SDT may have a level one criteria of a table ID, a level two criteria of a transport stream ID, and a level three criteria of an original network ID. A transport stream ID identifies which frequency a satellite is using in transmitting a signal. The original network ID identifies a network which originally broadcasts a particular service. An EIT might have a level one criteria of a table ID, a level two criteria of a service ID, a level three criteria of a transport stream ID, and a level four criteria of an original network ID. A service ID identifies a service within a specific transport stream ID.

A section is a transmission unit which includes a number of packets. The total number of packets included in a section may vary from table to table. For example, the largest section for NIT is approximately 1024 bytes. A table, such as an NIT, may be split into a plurality of sections, such as 256 sections. A section may include a header. An example of a number of bytes to be included in a section header is the first 8 to 12 bytes. When the start of a new section is detected, the section header may be acquired from the transport screen and passed to the software filter process to determine if the remainder of the section should be acquired. NIT, BAT and SDT sections may have up to 1024 Bytes length. However, the EIT section may have a length of up to 4096 Bytes.

Figure 3:
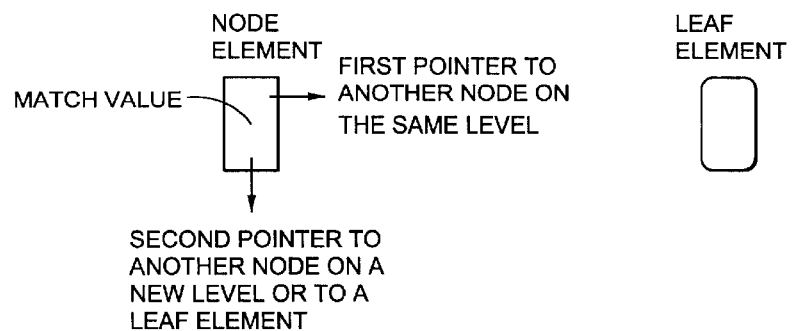
FIG. 3 is an illustration of a parse tree which may be used for a software filter.
Figure 3:
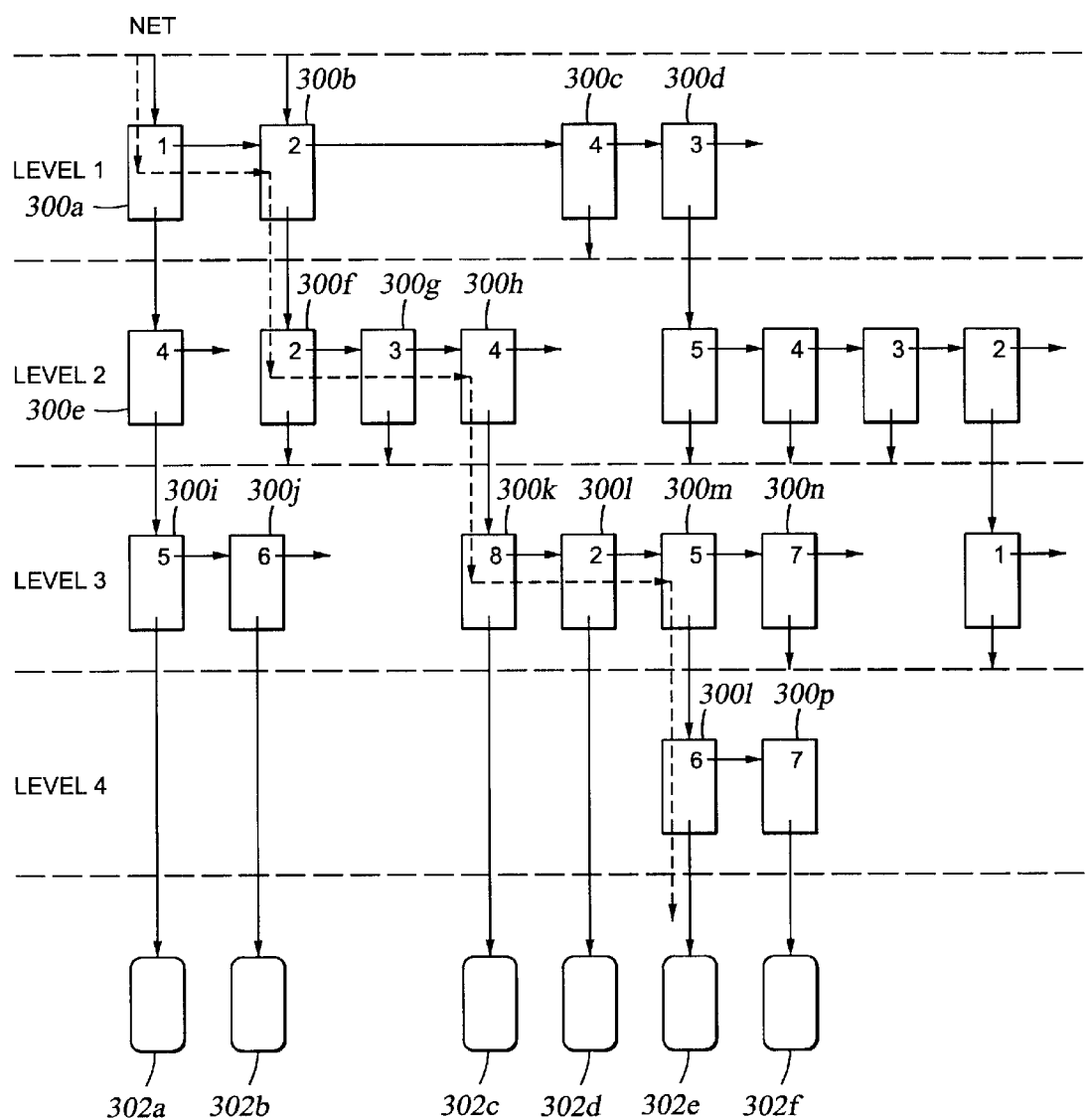

As data packets are passed along from the hardware PES filters to the software filter, the software filter may then provide further filtering of the packet stream. One example of a conventional filtering process is illustrated in FIG. 3. FIG. 3 shows a binary tree including nodes 300A–300P and leaves 302A–302F. In the example of the use of the binary tree in software filtering shown in FIG. 3, a section of the packet stream which has been passed along by the hardware PES filters to the software filter is checked against a root node 300A to determine if this section is a section which is to be accepted.

If the analyzed section does not match the criteria recorded in the level one node 300A, then the analyzed section is compared with the criteria stored in the level one node 300B. If the analyzed section does not match any of the criteria's stored in any of the level one nodes 300A–300D, then the section is rejected. If, however, the analyzed section matches one of the criteria's associated with one of the level one nodes 300A–300D, then the analyzed section is compared to a level two set of criterias associated with the level one criteria which matched with the analyzed section. For example, if an analyzed section did not match a criteria associated with level one node 300A, but did match with a criteria associated with level one node 300B, then the analyzed section would then be compared to a set of level two nodes 300F–300H associated with the matching level one node 300B.

If the analyzed section does not match with any of the level two to nodes 300F–300H associated with the matching level one node 300B, then the analyzed section is rejected. If, however, the analyzed section matches a criteria associated with a level two node, such as node 300H, then the analyzed section is compared with criterias associated with a set of level three nodes 300K–300N. If there are only two levels of criteria associated with a particular table, such as the NIT and BAT in the example described above, then the analyzed section would be accepted after matching the level two criteria of node 300H.

This process continues until the analyzed section is either rejected by failing to match any of the criterias associated with a node at a particular level, or the analyzed section is accepted after being matched with all criterias stated at all levels. The leaves 302A–302F are the final elements of a particular branch of the binary tree, wherein the analyzed section is accepted if it reaches a leaf 302A–302F. For example, an analyzed section may progress through a branch 300A–300B, 300F–300H, 300K–300M–300L, to a final leaf 302E.

A predetermined number of nodes and leaves are preallocated in memory to accommodate the software filtering process. An example of the memory preallocated for nodes and leaves may be approximately 27 kilo bytes for a given number of nodes (such as 930 nodes) and a given number of leafs (such as 250 leaves). This preallocated amount of memory is typically a substantial portion of memory in the set top box of an interactive television system since set top box typically only has a small amount of memory, such as approximately ½ mega byte to one mega byte.

Figures 4, 5:
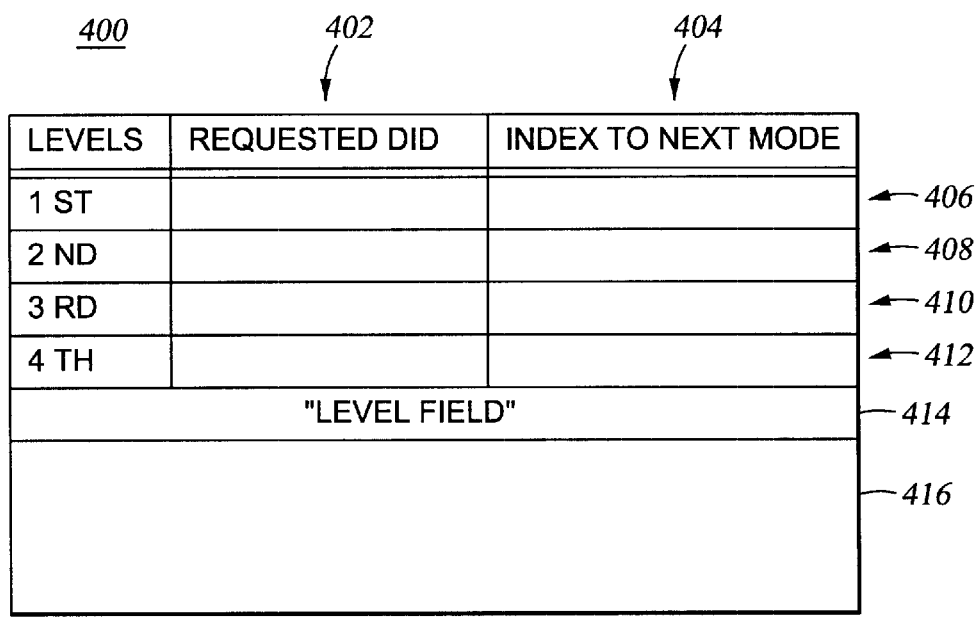
FIG. 4 is an illustration of a section mapping which may also be used with a software filter.
FIG. 5 illustrates a sub-table node data structure for use with a software filter according to an embodiment of the present invention.

Once a set of data has been accepted by the software filter, it is typically desirable to determine which sections associated with a particular system information table has been properly received. FIG. 4 illustrates a conventional method for keeping track of whether a particular section associated with a given system information table has been received. An array of 32 bit is typically reserved for keeping track of whether a section of a particular system information table has been received. This 32-bit array is commonly referred to as a section map. A system information table may include a large number of sections, for example 256 sections. Each bit within the 32 bytes of the section map may indicate whether a specific section number has been received. In the example shown in FIG. 4, byte 1 includes bits 1 to 8 which may indicate whether section numbers 0–7 have been received, the second byte also includes 8 bits which may include whether section numbers 8 to 15 have been received, and so on, up to byte 32 indicating up to whether section 248 to 255 has been received.

A table may include 256 sections. Accordingly, enough memory space is typically reserved to be able to indicate the receipt of 256 sections. However, only two or three sections are usually included in a system information table, and most of the memory space reserved for the section map typically remains unused.

Although this process may be effective as a software filtering mechanism, it would be desirable to reduce the memory requirements of the software filtering process without decreasing the speed of the software filter process. Additionally, it would also be desirable to have a bit map system which requires less memory. The present invention addresses such needs.

FIG. 5 is a data structure according to an embodiment of the present invention. The data structure 400 shown in FIG. 5 include multiple fields, herein shown in rows 406–412 and columns 402–404. In this example, it is assumed that there may be up to four levels of criterias that the software filter may search for a match to a received table data. In column 402, the requested criteria is listed in a field associated with each level 406–412. In column 404, an index to the next subtable node to be used if a match is found with an associated requested criteria 402. For each field in the requested criteria column 402 and the index column 404, a predetermined number of bytes, such as 2 bytes, may be reserved.

The subtable node 400 is also shown to include a level field 414. An example of memory space which may be reserved for the level field 414 is one byte. The level field may include a value indicating a level, in this example 1–4, which indicates which levels are valid fields. For example, if level field 414 indicated level one, then only level one (row 406) needs to be checked for a match for a given section. In another example, if the level field indicates 3, then levels one (row 406), two (row 408), and three (row 410) are valid and level four (row 412) does not need to be checked for a match with a received section.

Area 416 may be reserved for additional information. For example, area 416 may be several fields, such as seven fields, used to store information, such as system information table version number, flags for indicating whether the subtable node 400 is still valid, a counter counting how many sections are waiting to be processed, a client index, a subtable filter index, a tag, and a section map. Further details of the section map will later be discussed in conjunction with FIGS. 9A–11. A client index may be a database structure pointing to a root subtable node (first subtable node to be analyzed) associated with this subtable node 400. A subtable filter index may be an index to other structures within the software filter, not related to this subtable node binary tree. The tag may be a tag originating from a client for use for various purposes determined by the client.

Figure 6:
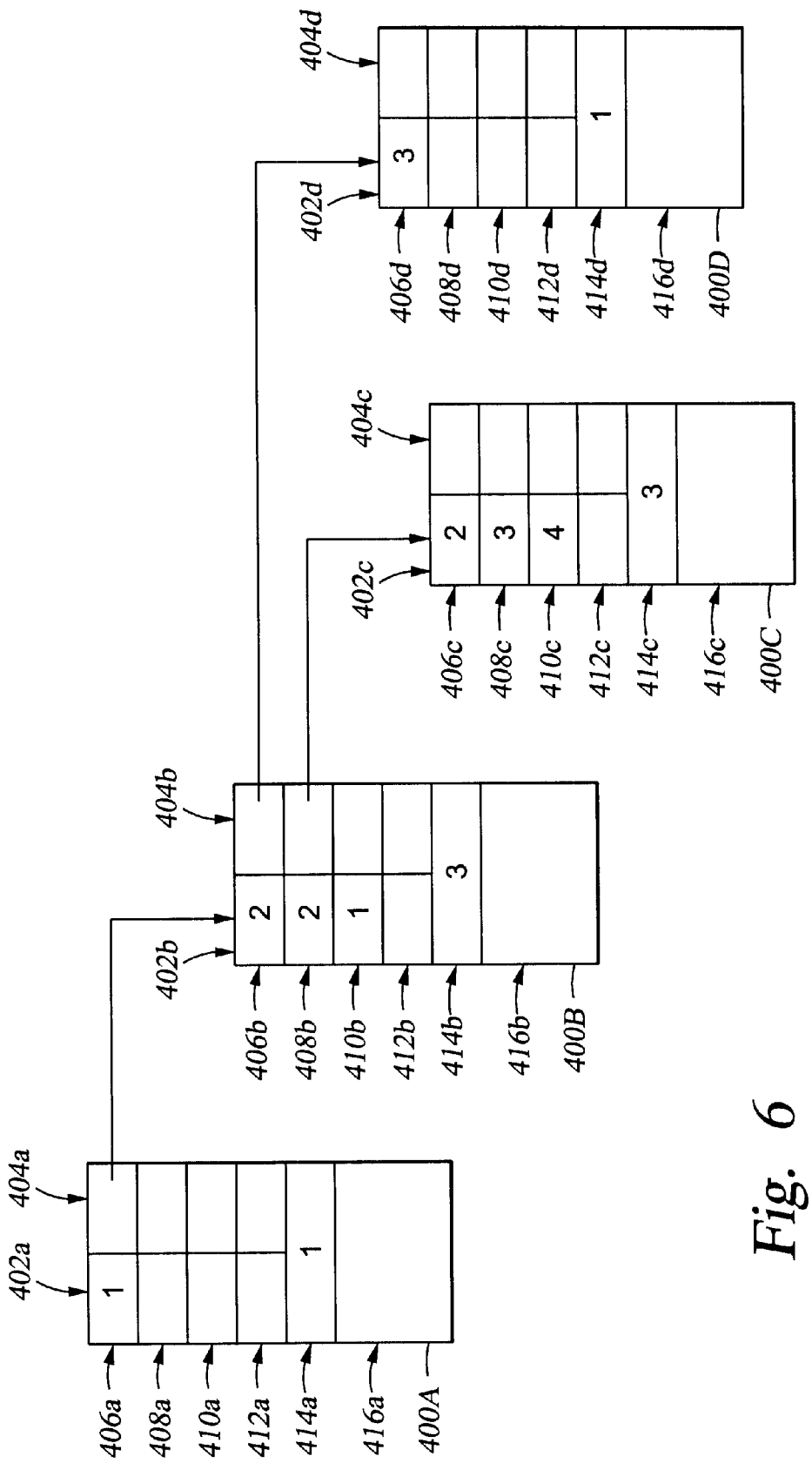
FIG. 6 is an illustration of relationships between sub-table nodes according to an embodiment of the present invention.

FIG. 6 shows an example of a set of subtable nodes 400A–400D according to an embodiment of the present invention. A section is received from the hardware PES filter by the software filter according to an embodiment of the present invention. This section is first analyzed through a root subtable node 400A. A root subtable node 400A is the first subtable node to be compared with a received section. If there are two suitable subtable nodes which have a criteria 402 at level one 406 which matches the analyzed section, then the subtable node with the highest number in the level field 414 is evaluated before the subtable node with the lower number in the level field 414. Accordingly, subtable nodes with criterias at level one which match the section are evaluated sequentially by the highest level field 414 down to the lowest level field 414.

In an embodiment of the present invention, if a field of a subtable node 400 is valid, then the previous fields may also be assumed valid within the same subtable node 400. The previous fields are the fields in column 402 which are in lower levels 406–412 then the field which is valid. For example, if level field 414 identifies level three (row 410), then it is assumed that levels one (row 406), and two (row 408) are also valid.

In the example shown in FIG. 6, a section is evaluated in the first level 406A of column 402A of a root node 400A. If there is a match between the section and the criteria associated with the first level 406A of the root node 400A, then the second level 408A of column 402A of the root node 400A is checked for a match, and if a match is found at the second level 408A of column 402A, then the third level 410A of column 402A is checked, and so on until all the levels 406A–412A of column 402A have been checked for a match in the root node 400A. If a match is not found at a level 406A–412A in the root node 400A, then an associated index located in the same level in column 404A of the root node 400A is referenced to determine which subtable node to check next. For example, if a match has not occurred in level one 406A of column 402A of the root node 400A, then rather than checking level two 408A of the root node 400A, an index located in the field of row 406A, column 404A, is checked to determine the next subtable node to be referenced. In this example, subtable node 400B is the table indicated in the index associated with the matching criteria of level one of the root node 400A. In table 400B, the same level that failed to find the match in the root node 400A is checked for a match. In our example, since there was no match found in level one of the root node 400A, level one 406B of the next subtable node 400B is then checked. If the first level 406A of the root node 400A is a match with the section, then the section is checked with the second level 408A of column 402A of root node 400A to check for a match.

In the next table 400B, if the first level to be checked (which is the corresponding level to the level which failed to match with the section in the previous subtable node) also fails to match, then the index 404B corresponding to the level which failed to match is checked to determine the next subtable node to be analyzed. In this example, the first level to be analyzed in subtable node 400B is level one 406B of column 402B since the corresponding level in the root node 400A which failed to match was also in level one 406A.

If a match is found in level one 406B of column 402B of the subtable node 400B, then the next level 408B of the subtable node 400B is checked for a match. If, however, there is no match found in the first level 406B of column 402B of subtable node 400B, then the associated index located in the field of row 406B, column 404B, is referenced to determine the next subtable node 400D to be checked. If a match was found in level one 406B of column 402B of subtable 400B, then the next level, level two 408B of subtable node 400B is checked for a match. If a match does not occur at that level, then the associated index located in a field in row 408B, column 404B, is referenced to determine the next subtable node 400C to be checked.

Assume a match has not been found in level two 408B of subtable node 400B. The associated index in column 404B directs the next comparison to be with level two 408C of subtable node 400C.

Figure 7:
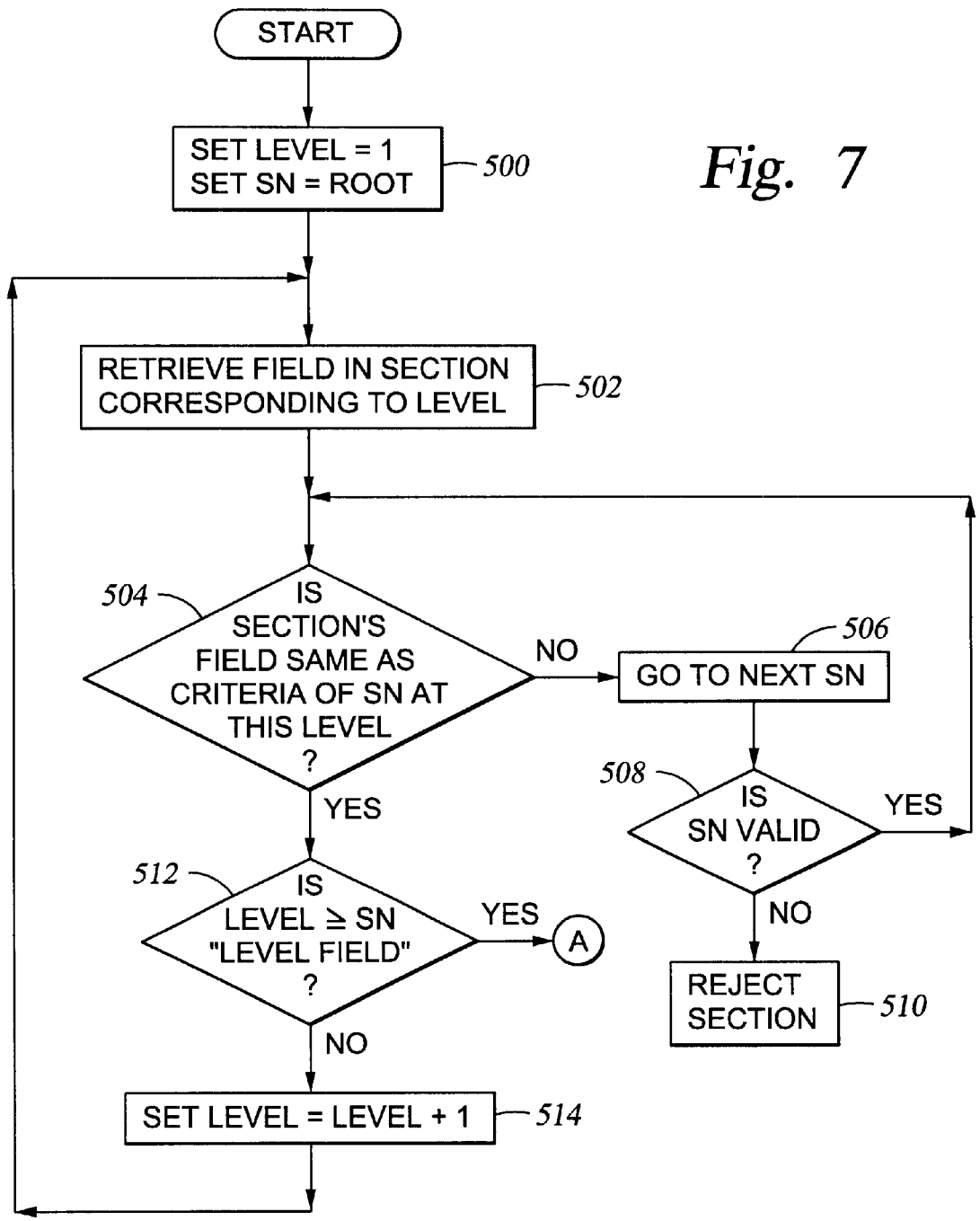
FIGS. 7–8 are flow diagrams of a method according to an embodiment of the present invention for filtering information sections.
Figure 8:
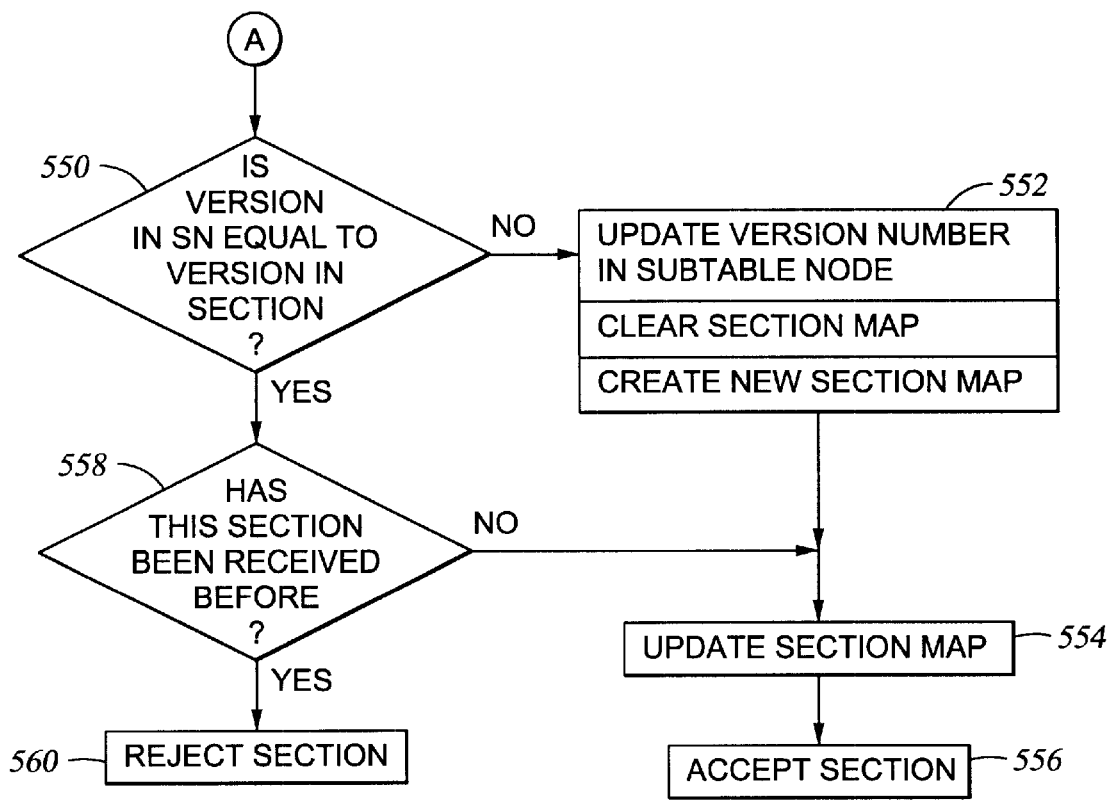

FIGS. 7 and 8 are flow diagrams of a method according to an embodiment of the present invention for filtering sections from a packet stream. A level is set to one, and a subtable node (SN) is set equal to root (step 500). A field in the section corresponding to the level (level ID) is retrieved from a section to be analyzed (step 502). Examples of the level's ID include criterias such as table ID, network ID, bouquet ID, original network ID, transport stream ID and service ID. The level's ID may be found in the section header.

FIGS. 12A–12D are illustrations of examples of various section headers. FIG. 12A shows an example of a NIT header 900a which includes fields 902a–902d. In this example, field 902*a* is a table ID, field 902*b* is a network ID, field 902*c* is a version number, and field 902*d* includes a current section number and the last section number. FIG. 12B shows an example of a BAT header 900*b* with fields 902*a'*–902*d'*. In this example, field 902*a'* is a table ID, field 902*b'* is a bouquet ID, field 902*c'* is a version number, and field 902*d'* includes a current section number as well as the last section number. FIG. 12C shows an example of an STD header 900*c* with fields 902*a"*–902*e*. In this example, field 902*a*: is a table ID, field 902*b*: is a transport stream ID, field 902*c"* is a version number, field 902*d"* includes the current section number and the last section number, and field 902*e* is an original network ID. FIG. 12D shows an example of an EIT header 900*d* with fields 902*a'''*–902*f*. In this example, field 902*a'''* is a table ID, field 902*b'''* is a service ID, field 902*c'''* is a version number, field 902*d'''* includes a current section number and a last section number, field 902*e'* is a transport stream ID, and field 902*f* is an original network ID.

In the examples shown in FIGS. 12A–12D, fields 902*a*–902*a'''* may be level one IDs, fields 902*b*–902*b'''* may be level two IDs, fields 902*e*–902*e'* may be level three IDs, and field 902*f* may be a level four ID. For example, these fields include level IDs that may be retrieved in step 502 of FIG. 7. Note that the number of valid level fields varies depending on the section type (NIT, BAT, SDT etc.). Fields 902*a*, 902*a'*, 902*a"*, and 902*a'''* are shown to include table IDs. The contents of these fields 902*a*–902*a'''* may determine the contents of the remainder level IDs 902*b*, 902*b'*, 902*b"*, 902*e*, 902*b'''*, 902*e'*, and 902*g*.

In addition to the level IDs, the header 900 may include various other information, such as a version number, and a current section number as well as the last section number. Further details of fields that may be included in section headers may be found in Digital Video Broadcasting (DVB) Standard EN 300468.

It is then determined whether the level ID (retrieved value of the section's field) retrieved from the section matches the subtable node's criteria in the same level (step 504 of FIG. 7). For example, if the level is set to one, and the subtable node is set to the root node, such as root node 400A of FIG. 6, and the criteria associated with the field in level one 406A of column 402A of root node 400A of FIG. 6 is a particular table ID, then the level one identification found in the section header of the section being analyzed is compared to the table ID identified in level one of the root node 400A to see if they match.

If the level ID retrieved from the section is not the same as the criteria identified in the subtable node of the current level, then the next subtable node is determined (step 506). The next subtable node may be determined by the index in column 404 of the current level row of the subtable node, as shown in FIG. 6.

It is then determined whether this subtable node is valid (step 508). A flag indicating whether a subtable node is valid may be stored in area 416 of the node 400, as shown in FIG. 5. If the subtable node is not valid, then the current section is rejected (step 510). If, however, the current subtable node is valid, then it is again determined whether the section's level ID is the same as the criteria in the current subtable node at the same level (step 504).

If the level ID of the section is the same as the subtable node's criteria for the same level (step 504), then it is determined whether the level is greater or equal to the current subtable node's level field (step 512), such as level field 414 of FIG. 5. If the level is less than the subtable node's level field, then the next level is considered (step 514) (set level=level+1). A field in this section corresponding to this next level (next level ID) is then retrieved (step 502).

If the level is greater than or equal to the level field of the subtable node (step 512), such as the level field 414 of FIG. 5, then it is determined whether a version in the current subtable node is equal to a version in the section (step 550 of FIG. 8). The version number may be located in the additional field 416 of the subtable node 400 shown in FIG. 5. This version number stored in the subtable node may be compared to a version number stored in the section header, such as in field 902*e* of the header 900 of FIG. 12. If the version number in the subtable node is not equal to the version number in the section header, then the version in the subtable node is updated, the section map is cleared and a new section map is created (step 552). When a section with a new version is received, all of the sections associated with the new version should be reacquired to ensure that all changes have been received. Accordingly, the section map that has been tracking the receipt of the old version may be cleared, and a new section map may be created to keep track of the receipt of sections in the new version. Details of manipulations of the section map is later discussed in conjunction with FIGS. 9A–11. Thereafter, the section map is updated with the sections in the new version as they are acquired (step 554). The section is then accepted (step 556).

If the version in the subtable node is equal to the version in the section (step 550), then it is determined whether this section has been received before (step 558). It is possible that portions of a version of a table has been received with some missing sections. Accordingly, a check is performed to determine whether this section is one of those missing sections. Details of this determination are later discussed in conjunction with FIG. 10. If this section has been received before, then the section is rejected (step 560). If, however, this section has not been received before, then the section map is updated to indicate that this section is being accepted (step 554) and the section is accepted (step 556).

Figure 9A:
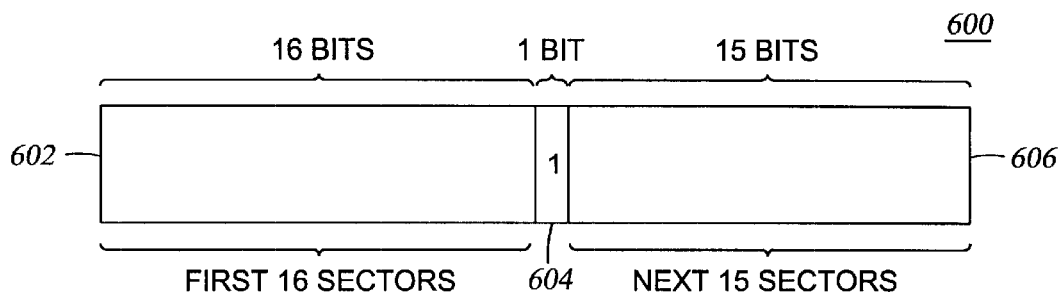
FIGS. 9A–9B are illustrations of a section map according to an embodiment of the present invention.
Figure 9B:
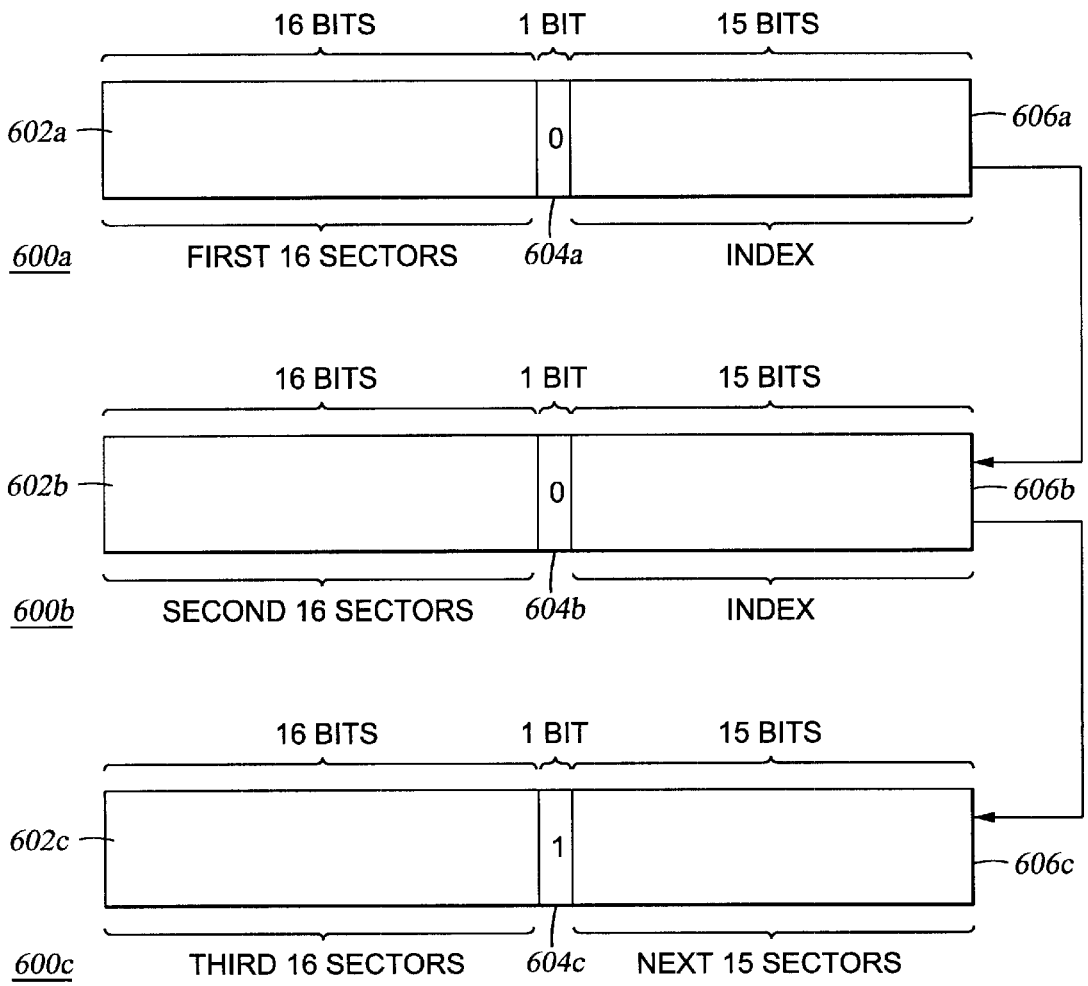

FIGS. 9A–9B illustrate a section map according to an embodiment of the present invention. A section map may be located in the area 416 of the subtable node shown in FIG. 5. The section map includes a field with multiple bits, for example a 32-bit field with the last 16 bits 602 indicating whether the first 16 sections have been received. Each bit in the 16-bit area 602 may indicate whether a corresponding section has been received. Another bit 604 may be used to indicate the function of the first 15 bits 606. For example, when the indicator bit 604 is set to one, the first set of bits 606 may indicate the received status of whether the next 15 sections have been received. If, however, the indicator bit 604 is zero, then it may indicate that the first section 606 may be an index to point to the next section map field.

FIG. 9B shows an example of the indicator bit indicating an index when it is set to zero and the status of the next 15 sections when the indicator bit is set to one. In this example, a first 32-bit field 600A has collected the status of the first 16 sections in a second portion 602A. In this example, the second portion 602A includes 16 bits, each bit indicating whether a section has been received. The indicator bit is located between the first portion 602A and a second portion 606A. In this example, the indicator bit 604A is set at zero and is one bit. The zero in the indicator bit 604A indicates that the first portion 606A is an index pointing to the next section map 600B. The next section map 600B may also be a 32-bit field with a first portion 606B, a second portion 602B, and an indicator bit located between the first portion 606B and the second portion 602B. The second portion 602B records the status of the second set of 16 sections. In this example, the indicator bit 604B is also set to zero, thus indicating that the first portion 606B of the second section map 600B is also an index pointing to a third section map 600C. The third section map 600C also stores a third set of bits indicating the status of 16 sections. However, the indicator bit 604C is set to one, indicating that this section map 600C is the last section map and that the first portion 606C indicates the status of the next set of sections, in this example the next 15 sections.

Figure 10:
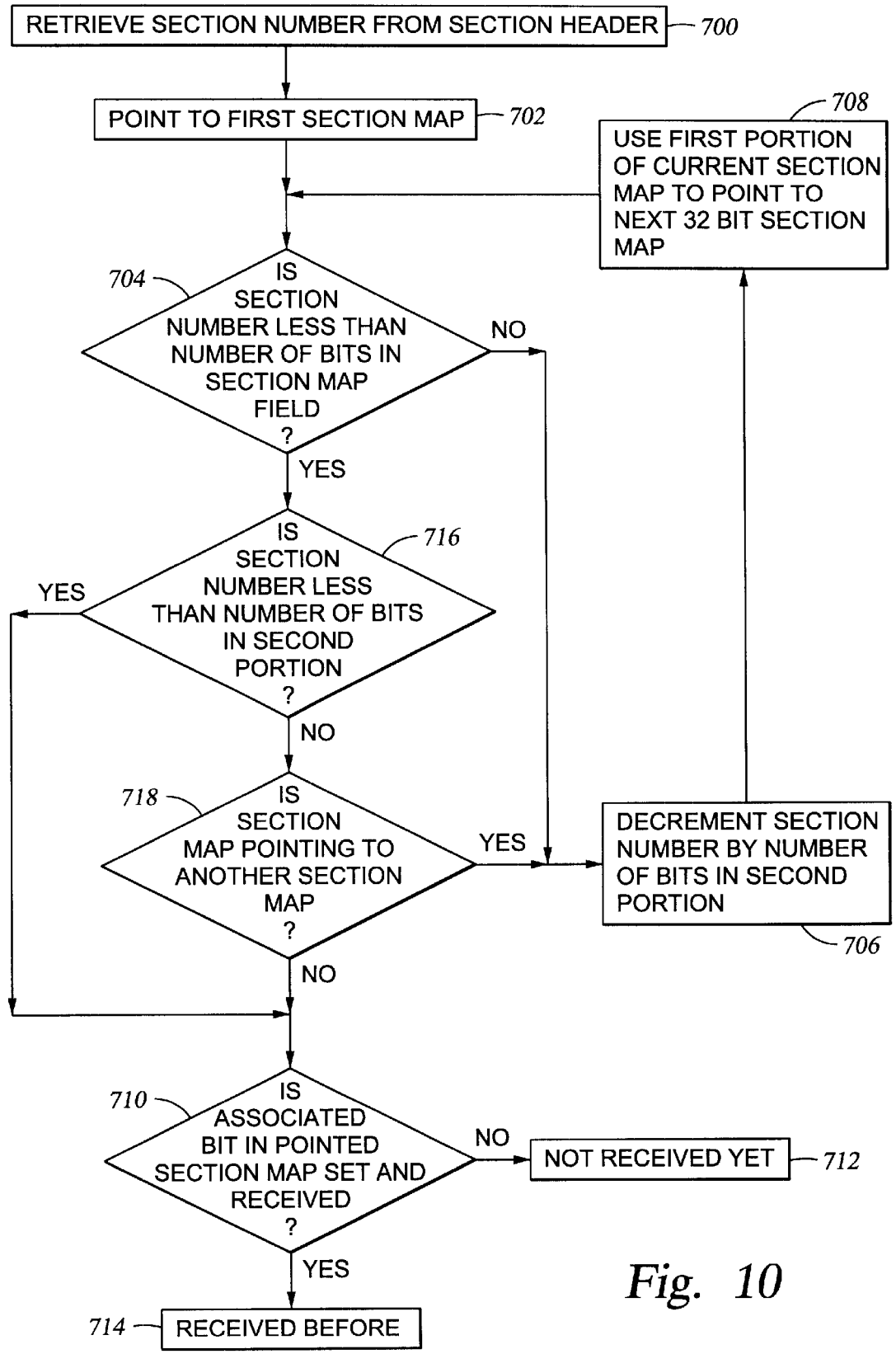
FIG. 10 is a flow diagram according to an embodiment of the present invention for determining whether a section has already been received.

FIG. 10 is a flow diagram of a method according to an embodiment of the present invention for determining whether a section has already been received, such as the determination of step 558 of FIG. 8. A section number is retrieved from the section (step 700). A first section map, such as section map 600A of FIG. 9B, is analyzed (step 702). It is then determined whether the section number is less than the number of bits preallocated for a section map field (step 704). In this example, it is determined whether the section number is less than 31 (note that sections are counted from 0 to 255 in this example).

If the section number is not less than the number of bits preallocated for a section map field, then the section number is decremented by the number of bits preallocated for the second portion of the section map field (step 706). In this example, the section number is decremented by 16. The first portion of the current section map is used to point to the next section map (the next 32 bit section map field) (step 708). Thereafter, it is again determined whether this section number is less than the number of bits in the section map field (step 704).

If the section number is less than the number of bits in the section map field (step 704), then it is determined whether the section number is less than the number of bits in the second portion (step 716). In this example, the number of bits in the second portion is fifteen. If the section number is not less than the number of bits in the second portion, then it is determined whether the current section map is pointing to another section map (step 718). An example of how this determination can be made is to set the indicator bit to indicate pointing to another section map. If this section map is pointing to another section map, then the section number is decremented by the number of bits in the second portion (step 706). If, however, this section map is not pointing to another section map (step 718), or if the section number is less than the number of bits in the second portion (step 716), then it is determined whether a bit associated with the current section indicates whether the section has been received (step 710). For example, a one may be used in the bit associated with the current section to indicate that it has been received (step 714). If the associated bit is not set in the pointed section map (step 710), then the section has not yet been received (step 712).

Figure 11:
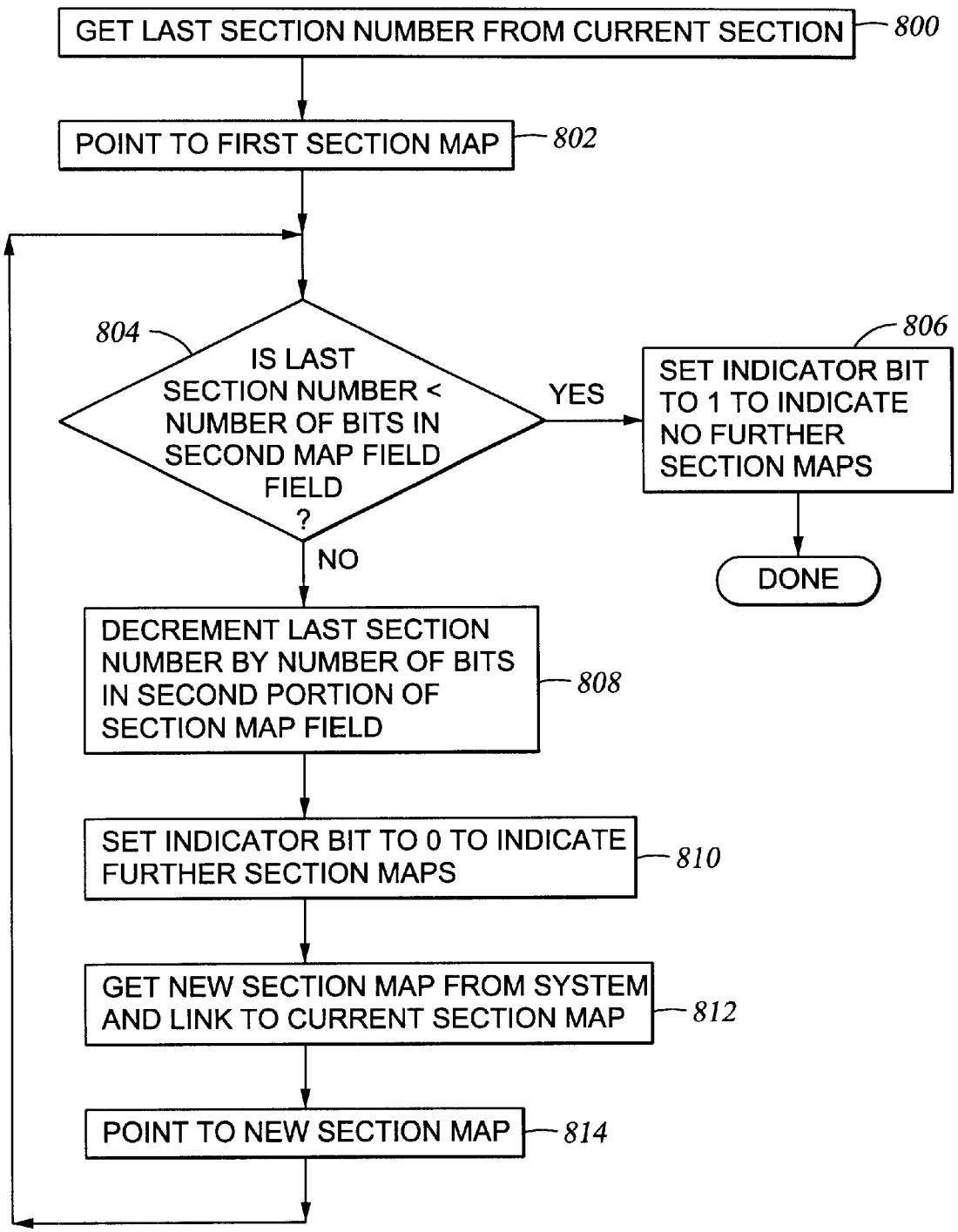
FIG. 11 is a flow diagram according to an embodiment of the present invention for creating a new section map.

FIG. 11 is a flow diagram of a method according to an embodiment of the present invention for creating a new section map, such as in step 552 of FIG. 8. The last section number from the current section is retrieved (step 800). Each section identifies its own section number, as well as the last section number so that the receiving system knows how many more sections are still yet to come. A first section map, such as section map 600A of FIG. 9B, is used (step 802). It is then determined whether the last section number is less than the number of bits in the section map field (step 804). In this example, it is determined whether the last section number is less than 31. If the last section number is less then the number of bits in the section map field (step 804), then the indicator bit is set to one to indicate that there are no further section maps (step 806). In this example, the indicator bit is bit 15. Accordingly, the creation of the new section map is complete.

If the last section number is not less than the number of bits in the section map field (step 804), then the last section number is decremented by the number of bits in the second portion of the section map field (step 808). An example of the number of bits of the last section of the section map field is the 16 bits located in the second portion 602 of FIG. 9A.

The indicator bit is then set to zero to indicate that there are further section maps (step 810). A new section map is then retrieved from the system, such as from random access memory (RAM) and linked to the current section map (step 812). The new section map is then pointed to by the first portion, such as first portion 606 of FIG. 9A, of the previous section map (step 814). It is then again determined whether the last section number is less than the number of bits in the section map field (step 804), and so on, until the process is complete.

A method and system for information filtering has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for filtering table data received at a set top box in an interactive television system comprising:

accessing table data associated with a section at a set top box;

accessing a data value in a field in a data structure, the data structure comprising a plurality of criteria;

accessing the data structure in accordance with the data value for a match to the received table data, to determine if the table data matches criteria in the data structure;

(a) setting a current sub table node to a root for the sub table node;

(b) accessing a level value for a current sub table node;

(c) comparing the table data to a criterion of the current sub table node at a current level;

if the table data is equal to the criterion of the current sub table node at the current level, then go to step (d) if not go to step (e)

(d) if the current level is less than the level value, then go to step (e) else go to step (f)

(e) setting the current level to current level+1 and going to step (c)

else go to step (f)

(f) accessing an index associated with the current level, the index pointing to the next sub table node;

if the next sub table node is valid, then go to step (g)

(g) setting the current level to 1, setting the current sub table node equal to next sub table node; and going to step (g)

else, go to step (h)

(h) rejecting the section associated with the table data.

2. The method of claim 1, step (e) further comprising:

(a1) if a version in the current sub table node is equal to version in the section, then go to step (b1)

(b1) if this section has been received before,
then go to step (c1)
(c1) rejecting the section;
else, go to step (d1)
(d1) updating a section map; and
accepting the section
else, go to step (e1)
(e1) updating a version number in the subtable node;
clearing a section map;
creating a new section map;
updating a section map; and
accepting the section.

3. The method of claim 1, further comprising:
(a2) retrieving a section number for the section;
(b2) pointing to a section map;
(c2) determining whether the section number is less than a number of bits preallocated for the section map;
if the section number is greater than or equal to the number of bits preallocated for a section map,
then going to step (d2)
(d2) decrementing the section number by the number of bits preallocated for a second portion of a section map field for a current section;
(e2) using a first portion of the section map field for a current section to point to a next section map; and
(f2) going to step (c2)
else going to step (g2)
(g2) if the section number is less than the number of bits preallocated in the second portion of the section map field for a current section,
then go to step (h2)
(h2) if section map is pointing to another section map,
then going to step (d2);
else go to step (i2)
(i2) if a bit associated with the current section in section map is set,
then go to step (j2) else go to step (k2)
(j2) indicating that the section map has already been received, go to step (l2);
(k2) else indicating that the section map has not already been received;
(l2) end.

4. The method of claim 1, further comprising:
(a3) accessing a last section number from a current section;
(b3) pointing to a first section map;
(c3) if the last section number is less than the number of bits in a section map field, then go to step (d3)
(d3) setting an indicator bit to a 1 to indication there are no further section maps;
else go to step (e3)
(e3) decrementing the last section number by the number of bits in a second portion of a section map field;
setting an indicator bit to a 0 to indicate further section maps;
accessing a new section and linking the new section map to the current section map; and
pointing to the new section map.

5. A computer readable medium containing instructions that when executed by a computer implement a method for filtering table data received at a set top box in an interactive television system comprising:
accessing table data associated with a section at a set top box;
accessing a data value in a field in a data structure, the data structure comprising a plurality of criteria;
accessing the data structure in accordance with the data value for a match to the received table data, to determine if the table data matches criteria in the data structure;
(a4) setting a current sub table node to a root for the sub table node;
(b4) accessing a level value for a current sub table node;
(c4) comparing the table data to a criteria of the current sub table node at a current level;
(d4) if the table data is equal to the criteria of the current sub table node at the current level,
then go to step (e4) if not go to step (f4)
(e4) if the current level is less than the level value,
then go to step (f4)
(f4) setting the current level to current level+1 and going to step (c4)
else go to step (g4)
(g4) accessing an index associated with the current level, the index pointing to the next sub table node;
if the next sub table node is valid, then go to step (h4)
(h4) setting the current level to 1,
setting the current sub table node equal to next sub table node; and
going to step (b4)
else, go to step (i4)
(i4) rejecting the section associated with the table data.

6. The medium of claim 5 further comprising instructions that when executed cause a computer to implement a method further comprising:
(a5) if a version in the current sub table node is equal to version in the section,
then go to step (b5)
(b5) if this section has been received before,
then go to step (c5)
(c5) rejecting the section;
else, going to stop (d5)
(d5) updating a section map; and
accepting the section
else, going to step (e5)
(e5) updating a version number in the subtable node;
clearing a section map;
creating a new section map;
updating a section map; and
accepting the section.

7. The medium of claim 5 further comprising instructions that when executed cause a computer to implement a method further comprising:
(a6) retrieving a section number for the section;
(b6) pointing to a section map;
(c6) determining whether the section number is less than a number of bits preallocated for the section map;
if the section number is greater than or equal to the number of bits preallocated for a section map,
then going to step (d6)
(d6) decrementing the section number by the number of bits preallocated for a second portion of a section map field for a current section;
(e6) using a first portion of the section map field for a current section to point to a next section map; and
(f6) going to step (c6)

(g6) else if the section number is less than the number of bits preallocated in the second portion of the section map field for a current section, then
if section map is pointing to another section map, then going to step (d6);
(h6) else
if a bit associated with the current section in the section map is set, then
(i6) indicating that the section map has already been received, go to step (m6);
(j6) else indicating that the section map has not already been received; and
(k6) end.

8. A computer readable medium containing instructions that when executed by a computer implement a method for filtering table data received at a set top box in an interactive television system comprising:
accessing table data associated with a section at a set top box;
accessing a data value in a field in a data structure, the data structure comprising a plurality of criteria;
accessing the data structure in accordance with the data value for a match to the received table data, to determine if the table data matches criteria in the data structure;
(a7) accessing a last section number from a current section;
(b7) pointing to a first section map;
(c7) if the last section number is less than the number of bits in a section map field, then going to step (d7)
(d7) setting an indicator bit to a 1 to indication there are no further section maps;
else going to step (e7)
(e7) decrementing the last section number by the number of bits in a second portion of a section map field;
(f7) setting an indicator bit to a 0 to indicate further section maps;
accessing a new section and linking the new section map to the current section map; and
(g7) pointing to the new section map.

* * * * *